June 24, 1930.  B. W. KING  1,766,826
SCALE
Filed Sept. 30, 1927   2 Sheets-Sheet 1

INVENTOR.
BERT W. KING
BY Stuart C. Barnes
ATTORNEY.

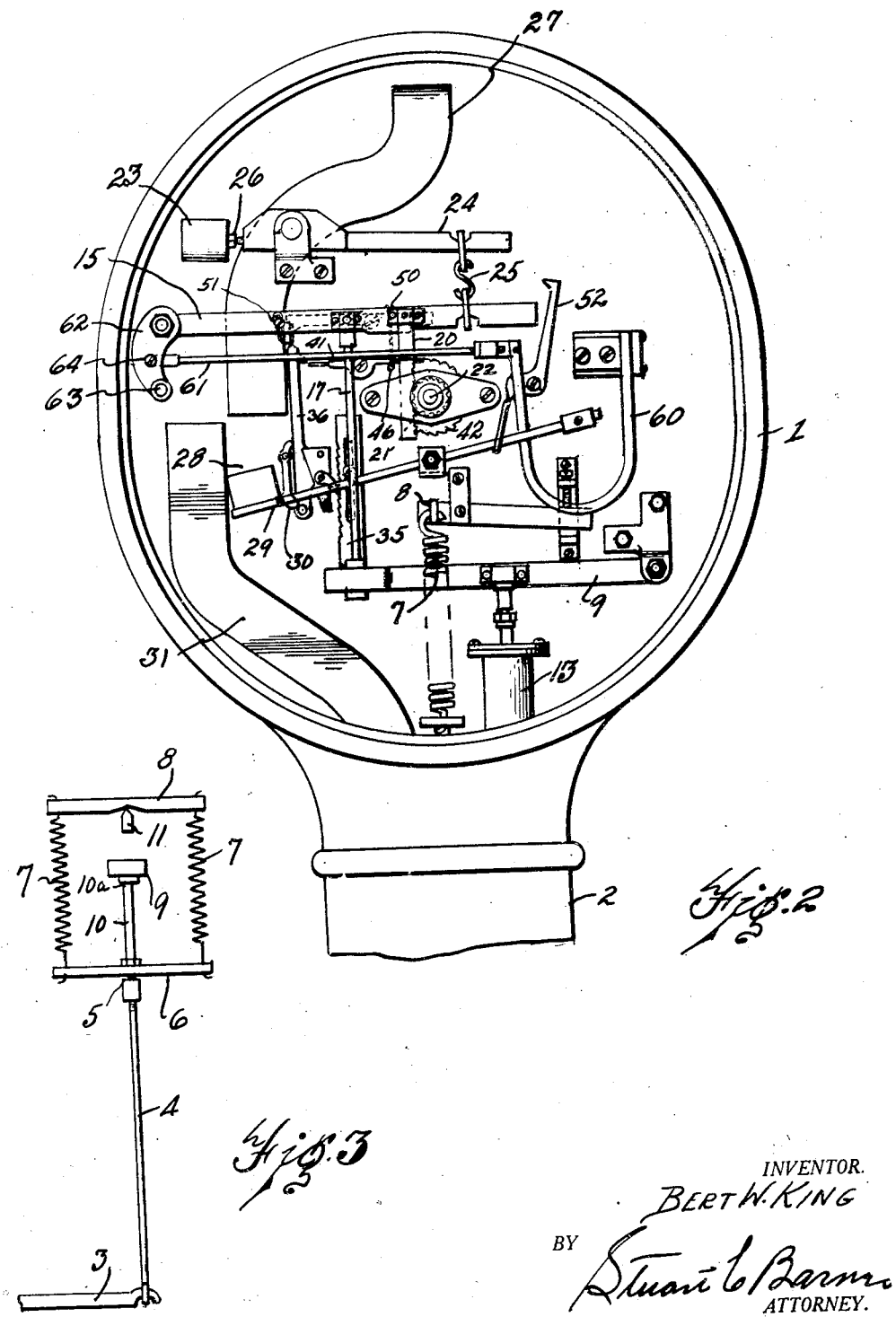

Patented June 24, 1930

1,766,826

UNITED STATES PATENT OFFICE

BERT W. KING, OF DETROIT, MICHIGAN, ASSIGNOR TO BARNES SCALE COMPANY, OF DETROIT, MICHIGAN, A CORPORATION OF MICHIGAN

SCALE

Application filed September 30, 1927. Serial No. 223,162.

This invention relates to a scale with particular reference to a scale mechanism adapted to operate subject to a coin or check control.

Such scales are used mostly in public places so that persons can ascertain their weight by inserting a proper coin. The invention contemplates an improved scale mechanism which is constructed so as to precent more than one weighing operation on the insertion of a single coin. There are a number of features of novelty in the mechanism which include a thermostatic control due to which the scale is accurate at various temperatures; a counter-weight construction which effects a nicety of action; arrangements whereby to permit adjustments to be made at various places in the mechanism; and other novel features which may best be brought out by a detailed description.

In the drawings:

Fig. 2 is a view similar to Fig. 1, showing the parts as they appear when operating and while a weight is on the scale.

Fig. 3 is an enlarged view showing details of the steelyard arrangement and the counterbalancing spring arrangement.

Figure 1:
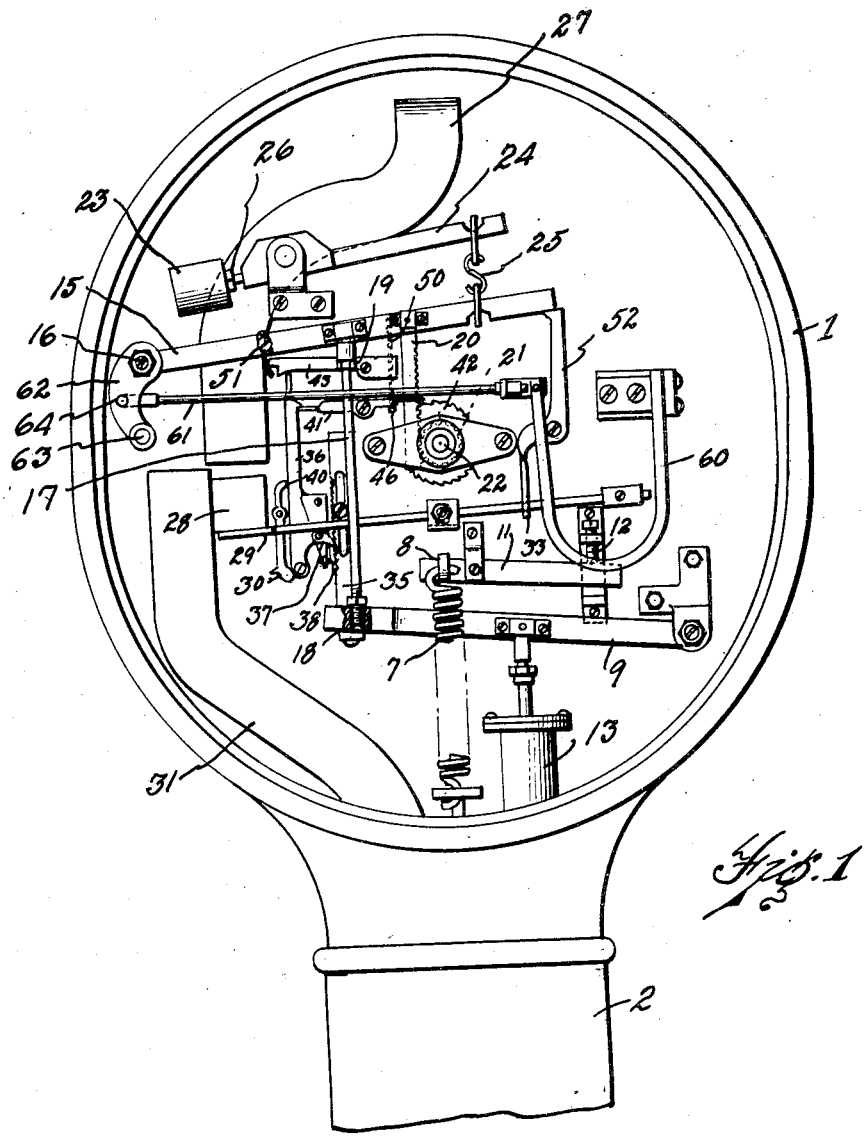
Fig. 1 is a diagrammatic view of the mechanism disposed in a scale casing, the parts being in locked position and ready for operation upon the insertion of a coin or check.

The scale has a suitable housing with a head 1 which carries most of the scale mechanism, and which also includes a pointer and dial (not shown). The head is supported by a post 2 which in turn is provided with the customary base portion (not shown). Within the base portion of the machine are suitable scale levers which include a nose iron 3 connected to a steelyard 4, the same being adjustably connected, as at 5, to a cross arm 6. A weight on the scale platform causes the cross arm 6 to move downwardly, the distance of which is determined by weight counterbalancing springs 7. A pivoted arm 9 is connected to the cross arm 6 by a connecting member or secondary steelyard 10 which is adjustable as at 10ª, so that this arm moves in accordance with the actuation of the scale levers.

Counterbalancing springs are suspended from a cross member 8 which is carried by a pivoted supporting member 11 (Fig. 1). This cross member 8 pivots in the member 11 so as to act as an equalizer. Member 11 may be adjusted on its pivot by means of a set screw 12. This construction affords an adjustment of the springs and scale mechanism in addition to the adjustments of the steelyards. A dash pot 13 is associated with the arm 9 to control the movements of this member and the associated parts in the usual manner.

The parts thus described are those parts which move when a weight is placed on the platform. The weight is not indicated, however, until the proper coin or check is placed in the machine to free what may be termed the follower mechanism now to be described.

This follower mechanism consists primarily of an arm 15 pivoted, as at 16, and carrying a depending rod 17. The lower end of the rod 17 rests in a socket 18 on the arm 9, in the nature of a pin point bearing. The rod 17 is adjustably connected to the arm 15, as at 19. A rack member 20 also depends upon the arm 15. This rack member engages with a gear 21 mounted on a shaft 22, which shaft carries an indicating pointer operating over a suitable dial (not shown).

The primary operation is as follows:

A weight on a platform pulls the arm 9 downwardly and pulls the socket 18 away from the lower end of the rod 17; upon the insertion of a proper coin or check the follower arm 15 drops until the rod 17 sets in the socket 18, this movement effecting a rotation of the shaft 22 and the pointer carried thereby, through the means of the rack and gear. This dropping movement of the follower arm is given a nicety of action, and a counter-weight 23 mounted on the pivoted arm 24 having a link connection 25 with the follower arm. The counter-weight 23 is adjustable on the arm 24 by screw threads and lock-nut 26.

The mechanism for controlling the movement of the follower arm is shown in Fig. 1 in locked position, or in other words, in a position to prevent indication of weight. A coin chute is shown at 27 and a coin falling from this chute drops down into the coin cup 28 carried by the pivoted arm 29. The weight of the coin deflects this arm from the position shown in Fig. 1 to that in Fig. 2, whereupon the arm is retained in this position by a suitable catch 30, the catch being counterbalanced as shown. The coin is then deposited into a second chute 31 where it is conducted to a suitable coin tray.

A pivoted check member 32 has an opening through which the arm 29 passes, as at 33. As shown in Fig. 1, this check member underlies the end of the follower arm 15 and prevents the same from moving downwardly. The pivotal movement of the arm 29, however, results in a camming action at the point 33 and pivots the arm to the position shown in Fig. 2 whereupon the follower arm moves downwardly to result in the indication of the weight.

The remaining mechanism to be described has to do, in the main, with the preventing of a second weight indication and with the resetting of the mechanism when the load is removed from the scale platform so that the parts are in position for a second operation when a proper coin or check is inserted.

An upright ratcheted member 35 is carried by the arm 9, and adjacent this ratchet member is a pivoted catch 36 which carries a pawl 37 acted upon by a spring 38. The catch member 36 is so weighted that it assumes a position with the pawl in engagement with the ratchet. Downward movement of the ratchet, in the weighing operation, causes the pawl to snap along the ratchet teeth. When weight is removed from the platform upward movement of the ratcheted member engages the pawl and swings the catch member 36 on its pivot. In so doing the catch 36 strikes the coin lever catch 30 at the point 40 to release the coin cup and permit it and the catch 32 to return to normal position.

The catch 36 engages over a pawl 41 which cooperates with a ratchet wheel 42 on the shaft 22. The catch 36 normally holds this pawl from engagement with the ratchet wheel. Upon actuation of the catch 36, the pawl 31 is released and it is so balanced as to drop onto the ratchet teeth on the wheel 42. This locks the shaft 22 so that re-weighing is prevented. The catch 36 is held outwardly by a pivoted latch member 43 which drops over the upper end of the catch when it is positioned outwardly by the action of the pawl 37.

This locking action of the weighing mechanism takes place upon removal of a slight amount of weight from the scale platform. In other words, a slight upward movement of the arm 9 rocks the catch 36 to release the pawl 41 the catch being held back in this locked position by the latch 43. When the parts of the mechanism approach fully returned position they reset to permit another operation of the machine. A flexible member, such as a chain 50, depends from the follower arm 15 to a suitable opening in the dog 41, and the end of the chain is provided with an enlargement 46; this arrangement provides for the lifting of the dog 41 from the ratchet 43 substantially at the instant that the follower arm 15 reaches its uppermost position. When the arm 15 reaches this uppermost position it snaps over the upper end of the pivoted catch member 32 so as to be held thereby. Immediately following the lifting of the pawl 41 the latch 43 is raised by a member 51 which catches the outer end of the latch 43 and raises the same. This permits the catch 36 to swing back from its position shown in Fig. 2 to that shown in Fig. 1, engaging the pawl 41 and holding the same from contacting with the ratchet wheel 42.

The parts are now in position to be again operated when a coin is inserted to release the catch member 32.

It is to be noted that the arrangement for preventing a second weighing operation comes into play when a slight amount of weight is removed from the scale platform. A very slight upward movement of the ratchet member 35 rocks the catch 36, and the pawl 41 immediately drops onto the ratchet wheel. The parts stay in this position so that reweighing can not be had throughout the entire return movement of the parts, and the parts are reset by the final upward movement of the follower arm 15.

The several adjustment features make possible accurate adjustment of the machine for correct weighing. The distance between the nose iron and the follower arm 15 is bridged by the primary steelyard 4, the secondary steelyard 10 and the rod 17, all of these members being adjustable. In scales employing the so-called follower mechanism, as the present one, there is ordinarily a quick drop of the follower mechanism upon release of the mechanism. In the present scale this drop is controlled more or less by the counterbalance weight 23 so that there is an ease of movement in the downward drop of the follower mechanism. This gives a nicety of action and eliminates undue vibration and wear and tear on the parts.

Coin controlled scales of this type are sometimes placed within buildings where the temperature is relatively high, and sometimes placed out of doors where the scales are subjected to varying temperatures.

Accordingly, a thermostat is placed on the present scale so that the same operates correctly at these varying temperatures. The thermostat unit per se may consist of a U shaped bi-metallic member 60 with one end fixed and the other end free. The free end of the thermostat is connected to a rod 61 for controlling the scale mechanism. The follower arm 15 is pivoted to a support 62 mounted to rock, as at 63. This support 62 may be bifurcated and the rod 61 is pivoted, as at 64, between these bifurcated parts.

Contracting and expanding movements of the thermostat effects rocking of the support 62, and this in turn shifts the position of the follower arm. This effects variation of the angular position of the rack 20 with respect to the gear wheel 21 which is carried on the pointer shaft. The angular position of this rack varies the relative positions as between the pointer on the shaft and the follower arm 15. The movement of these parts is not very great, and in practice the movement of the free end of the thermostat of about one-quarter of an inch is sufficient for regulating the mechanism through a temperature range of about 100° F.

Figure 4:
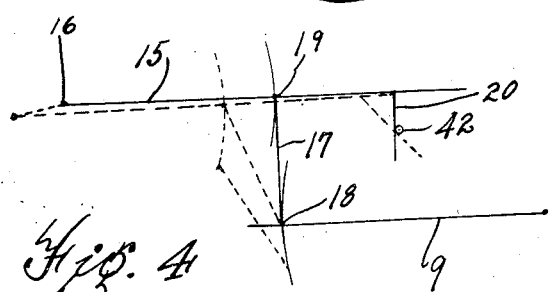
Fig. 4 is a diagrammatic view of certain of the scale levers indicating, in an exaggerated manner, their movements caused by the thermostat to accommodate for varying temperatures.

It will be noted that the arms or levers 9 and 15 are mounted on pivots so that they work in reverse arcs. This arrangement works in conjunction with the thermostat for keeping the scale accurate throughout a range of temperature. By referring to Fig. 4 it will be noted that the point 19 and the point 18 which are the connections at opposite ends of the push rod 17 with the members 15 and 9 respectively, work in reverse arcs. In the full lines the arm 15 is shown in a position so that the push rod 17 is approximately perpendicular to the levers 15 and 9. The dotted lines show a shifted position of the lever 15, and this results in the shifting of the arc through which the point 19 moves. Thus, the push rod 17 is angularly changed with respect to the lever 9.

It is of course to be understood that the lever 9 will move slightly as varying temperatures act on the counterbalancing springs. Also, the springs will be extended to varying lengths under a given load with varying temperatures, so that not only is there an initial change of position of the arm 9, but its lowermost position varies. A shifting of the lever 15 shifts the position of the rack 20 with respect to the gear wheel 42. This is calculated for the correct initial variation in the springs. The distance between the levers 9 and 15, when the scale is under load and operating, varies with the angular position of the push rod 17; in other words, when the push rod 17 is as near perpendicular to these two levers as can be, the distance is the greatest. When the push rod is disposed at an angle to the perpendicular, the distance is lessened. When the two levers are pulled down under a load the points 19 and 18 pull away from each other, the amount of which pulling away, due to the reverse arcs and resulting angular position of the push rod 17, is controlled by the thermostat. This is calculated to correct the scale reading when the springs are under load. In other words, variation in the distending of the springs under a given load is met by the variation and the angularity of the push rod so that the scale gives correct weights throughout the range of temperature.

Claims:

1. In a scale, the combination of means movable in the first instance in accordance with a load applied to the scale, including a scale lever, a load resisting means, and a primary steelyard connecting the lever to the load resisting means, an adjustable connection between this primary steelyard and one of the parts connected thereby, a secondary steelyard connecting a part of the load resisting means to an intermediate member, an adjustable connection between this secondary steelyard and one of the members connected thereby, indicating means including a follower mechanism having a part associated with the said intermediate member to position the indicating means in accordance with the position of this member, said part constituting a third portion of the steelyard, and an adjustable connection between this said part and the intermediate member and follower mechanism operably associated thereby.

2. In a scale, the combination of an arm associated with indicating means and adapted to move in accordance with weight applied to the scale, a pivoted support for the arm, a thermostatic element, and a connection between the thermostatic element and pivoted support for varying the position of the support in accordance with temperature changes.

3. In a scale, the combination of an arm associated with indicating means and adapted to move in accordance with weight applied to the scale, a pivoted support for this arm, a pivotal connection between this support and the arm, a thermostatic element, and a connection between the thermostatic element and the pivoted support for rotatably shifting the support on its pivot in accordance with temperature changes, whereby the position of the said arm associated with the indicating means is accordingly varied.

4. In a scale, the combination of scale indicating means including a shaft and gear, a pivoted arm, a rack on the arm for engagement with the gear, said arm being movable in accordance with weight applied to the scale, a pivoted support for the arm, and a thermostatic element acting on this support to rotatably vary the same in accordance with temperature changes, whereby to vary the angular relation which exists between the rack and the gear on the indicating means.

5. In a scale, the combination of means movable in the first instance in accordance with a load applied to the scale, indicating means including a follower mechanism adapted, upon release, to move to a distance determined by the movement of the first mentioned means, and counterbalancing means associated with the follower mechanism for controlling the movement thereof.

6. In a scale, the combination of means including a pivoted arm member which is movable in accordance with a load placed on the scale, indicating means including a follower mechanism, said follower mechanism comprising a pivoted arm, adapted upon release to drop, means associated with the arm for engaging the first mentioned arm to determine the amount of drop, a third pivoted arm having a connection with the pivoted arm of the follower and a counterbalancing weight on one end of this third pivoted arm.

7. In a scale, the combination of means including a pivoted arm which is movable in accordance with a load placed on the scale, indicating means including a follower mechanism, said follower mechanism comprising a pivoted arm, adapted upon release to drop, means associated with the arm for engaging the first mentioned arm to determine the amount of drop, a third pivoted arm having a connection with the pivoted arm of the follower and a counterbalancing weight on one end of this third pivoted arm said weight being adjustable toward and away from the pivot on this third arm, whereby to adjust the counterbalancing effect and control the dropping action of the follower arm.

8. In a scale, the combination of two levers mounted to work in reverse arcs, one of which is movable in response to a load on the scale, the other of which is associated with indicating mechanism, a push rod operably connecting the levers, and means for varying the angular position of the push rod in accordance with temperature change.

9. In a scale, the combination of two levers mounted to work in reverse arcs, means connecting the two levers, the opposite ends of which also work in reverse arcs, and means for shifting the position of the arc through which at least one end of the connecting means works, whereby to angularly shift the connecting means with respect to the two levers in accordance with temperature change to vary the distance between the points on the two levers where the connecting means connects.

10. In a scale, the combination of two levers mounted to work in reverse arcs, one of which is associated with counterbalancing springs and which is movable in the first instance in response to a load placed on the scale, the other lever being associated with indicating mechanism, the said levers being spaced apart, an operable connection between the levers, and thermostatic means for shifting one of the levers to vary the angular position of the connecting means, whereby this angular position progressively changes upon movement of the levers to meet the variation in the distention of the springs due to temperature changes.

11. In a scale, the combination of a lever movable in the first instance in response to a load placed on the scale, counterbalancing springs therefor, a second lever associated with indicating mechanism, a push link connecting the two levers whereby the first lever supports the second through the push link, thermostatic means for varying the angular position of this push link, whereby the push link holds the levers separated in the varying degrees which is calculated to meet the variation in the distention of the counterbalancing springs due to temperature changes.

12. In a scale, the combination of a lever movable in the first instance in response to a load placed on the scale, counterbalancing springs therefor, a second lever associated with indicating mechanism, a push link connecting the two levers whereby the first lever supports the second through the push link, thermostatic means for varying the angular position of this push link, whereby the push link holds the levers separated in the varying degrees, which is calculated to meet the variation in the distention of the counterbalancing springs due to temperature change, said levers being mounted to work in reverse arcs whereby the angularity of the push link progressively changes throughout the range of movement of the levers to meet the final variation in spring distention under a given load.

13. In a scale, the combination of a lever movable in the first instance in response to a load placed on the scale, counterbalancing springs therefor, a second lever, said levers being mounted to work in reverse arcs, a push link supporting this second lever from the first mentioned lever, indicating means including a gear, a rack on the second lever which engages the gear, means for movably mounting the pivot point of the second lever, and thermostatic means for varying the position of this pivot point to vary the angular relation of the rack which is calculated to correct the indicating mechanism and meet initial variation in the counterbalancing springs due to temperature change, the shifting of the pivot point also varying the angular position of the push rod, which angular position progressively changes throughout movements of the levers due to the reverse arcs, to vary the distance between the levers and which is calculated to meet the final variation in the distention of the springs when under load.

In testimony whereof I affix my signature.

BERT W. KING.